(12) United States Patent
Hsu

(10) Patent No.: US 7,140,328 B2
(45) Date of Patent: Nov. 28, 2006

(54) MINIATURE VAPORIZERS FOR USE WITH CHEMICAL CONVERTERS AND ENERGY DEVICES

(75) Inventor: Michael S. Hsu, Lincoln, MA (US)

(73) Assignee: Ztek Corporation, Woburn, MA (US)

( * ) Notice: Subject to any disclaimer, the term of this patent is extended or adjusted under 35 U.S.C. 154(b) by 184 days.

(21) Appl. No.: 10/095,843

(22) Filed: Mar. 11, 2002

(65) Prior Publication Data

US 2003/0167689 A1 Sep. 11, 2003

(51) Int. Cl.
*F28D 7/02* (2006.01)

(52) U.S. Cl. .................. 122/32; 122/36; 165/158; 165/163

(58) Field of Classification Search .......... 122/7 R, 122/32, 34, 36, 235.14; 165/145, 155, 157, 165/158, 177, 179, 180, 181, 163, 164; 138/38; 422/198, 200, 201
See application file for complete search history.

(56) References Cited

U.S. PATENT DOCUMENTS

| | | | | |
|---|---|---|---|---|
| 3,916,990 A | * | 11/1975 | Ruhe et al. | ............... 165/158 |
| 4,148,281 A | | 4/1979 | Stoll et al. | .................. 122/32 |
| 4,539,940 A | | 9/1985 | Young | ...................... 122/32 |
| 4,602,682 A | * | 7/1986 | Yamamoto et al. | ......... 165/174 |
| 5,425,415 A | * | 6/1995 | Master et al. | ............... 165/154 |
| 5,852,990 A | * | 12/1998 | Primdahl | ..................... 122/7 R |
| 6,242,119 B1 | | 6/2001 | Komura et al. | ............... 429/17 |
| 6,280,867 B1 | | 8/2001 | Elias | ........................... 429/34 |
| 6,283,068 B1 | | 9/2001 | Kamikozuru | ................ 122/32 |
| 6,352,054 B1 | * | 3/2002 | Yamada et al. | ......... 122/367.1 |
| 6,620,969 B1 | * | 9/2003 | Nishimura et al. | ........ 562/600 |

* cited by examiner

*Primary Examiner*—Gregory A. Wilson
(74) *Attorney, Agent, or Firm*—Lahive & Cockfield LLP; Anthony A. Laurentano, Esq.

(57) ABSTRACT

A miniature vaporizer for effectively vaporizing a process fluid (e.g., a liquid media) in small energy system applications, such as systems employing chemical reformers and fuel cells. The vaporizer of the present invention can employ a heating medium, such as a hot exhaust generated by a power system, as the heating source for generating steam or for evaporating a fluid (e.g., liquid chemicals or fuels). The vaporizer of the invention can optionally be configured to vaporize water thereby functioning as a miniature steam generator, to evaporate a process fluid thereby functioning as a miniature evaporator or heat exchanger, or to evaporate a process fluid and mix the fluid with another medium. This evaporator/mixer configuration can be used in reformer plants where a liquid chemical or fuel (e.g., gasoline, diesel, methanol, etc.) needs to be first evaporated and mixed with steam prior to the introduction of the resultant mixture to a converter (e.g., reformor or fuel cell).

52 Claims, 10 Drawing Sheets

MINIATURE VAPORIZERS FOR USE WITH CHEMICAL CONVERTERS AND ENERGY DEVICES

BACKGROUND OF THE INVENTION

Conventionally, steam is generated from a primary heat source or waste heat, which can then be used for various industrial and commercial processes, such as fuel reforming processes, steam generation processes, and a myriad of other activities or processes that require process steam. The large physical size and capacity of commercially available devices for generating steam render them impractical for use in many modern, energy technologies requiring delivery of process steam in a compact and cost efficient manner.

Conventional devices that utilize heat from a waste gas stream to produce steam and/or hot water include heat recovery boilers that may or may not employ auxiliary heat, an example of which is the Donlee Technologies, U.S.A., boiler Series No. HR-125 through 750-G. The smallest of these devices has a relatively large overall length of about 5 feet, a width of about 4 feet, and a height of close to 5 feet. The dry weight of this smallest boiler device typically exceeds one ton. Other units in the series double or triple the height, width and length, and can exceed three tons. The large size and extreme weight of this conventional boiler is impractical for use with modern, relatively small fuel reformers and fuel cell systems that can have system sizes not much bigger than state-of-the-art steam generators, which are considerably smaller than the foregoing boilers.

Conventional heat exchangers can provide heated gas or liquid, but are not designed to produce steam for various commercial processes. For example, a conventional device is a spiral plate type heat exchanger manufactured by Spirec N. A., U.S.A., such as illustrated and described in U.S. Pat. Nos. 3,705,618, 3,854,530 and 3,823,458, the contents of which are incorporated herein by reference. A drawback of the heat exchangers described in the foregoing patents is that they do not generate steam effectively.

There hence exists a need in the art to efficiently generate steam with a device suitable for use with modern processes, power systems and components. Hence, an improved modular device that can efficiently generate steam and perform several other functions would represent a major improvement in the art.

SUMMARY OF THE INVENTION

The present invention is directed to a relatively small or miniature vaporizer, which can be used effectively for vaporizing a process fluid (e.g., a liquid media) in small energy system applications, such as systems employing chemical reformers and fuel cells. The vaporizer of the present invention can employ a heating medium, such as a hot exhaust generated by a power system, as the heating source for generating steam or for evaporating a process fluid (e.g., liquid chemicals or fuels). The vaporizer of the present invention can optionally be configured to vaporize a process fluid thereby functioning as a miniature steam generator, to evaporate a process fluid thereby functioning as a miniature evaporator or heat exchanger, or to evaporate a process fluid and mix the process fluid with another medium. This evaporator/mixer configuration can be used in reformer plants where a liquid chemical or fuel (e.g., gasoline, diesel, methanol, etc.) needs to be first evaporated and mixed with steam prior to the introduction of the resultant mixture to a converter (e.g., reformer or fuel cell). This invention further describes a device that is capable of performing the combined vaporizing and mixing function in a single unified device.

According to one aspect of the invention, a vaporizer or an evaporator/mixer suitable for use with a chemical converter includes a housing forming a chamber, and a bundle element disposed within the chamber. The bundle element includes a conduit in fluid communication with one or more heat exchanging surfaces defining a confined flow volume that does not employ or is free of a baffle.

According to another aspect of the invention, the housing is configured to be oriented essentially in a vertical position during use. In this position, a process fluid can be introduced to the conduit through an inlet disposed at a bottom portion of the housing, and exits the conduit from an outlet located at a top portion of the housing.

According to still another aspect, the bundle element comprises a multi-sheet layer forming a heat exchanging surface, wherein the multi-sheet layer is wrapped about and disposed in fluid communication with the conduit. The multi-sheet layer is sealed along selected outer edges.

According to still another aspect, one or more sheets of the multi-sheet layer include surface features, such as generally parallel rows of dimples or corrugations.

According to yet another aspect, the heat exchanging surfaces comprise a plurality of sheets, at least one of the sheets having surface features forming spacers for separating the sheets from each other to form flow passages.

According to another aspect, the bundle element comprises a plurality of tubes disposed within the conduit, wherein a wall of at least one of the plurality of tubes and the conduit forms the heat exchanging surface.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention.

DESCRIPTION OF THE ILLUSTRATED EMBODIMENT

The present invention describes a relatively small or miniature vaporizer that can be sized and configured for vaporizing an input process fluid, such as a liquid medium, for use by a chemical converter or an energy system. The process fluid can include water, liquid chemicals, liquid fuel, gasoline, methanol, or diesel fuel. Other types of fluids can also be used. As used herein, the term chemical converter is intended to include any suitable structure adapted for receiving, processing or consuming a process fluid, examples of which include reformers, fuel cells, thermal control stacks, and hybrid systems employing multiple converters for providing multiple functions. The term "vaporizer" as used herein is intended to include any suitable heat exchanging structure adapted or configured to vaporize or evaporate a process fluid. The vaporizer can be particularly adapted or configured to exchange heat between and/or mix two or more fluids or media, while converting a liquid into a vapor. The vaporizer of the present invention can optionally be designed and operated to vaporize a liquid media in a modern energy system employing one or more chemical converters. Examples of applications or configurations of the vaporizer of the present invention include the use of hot exhaust generated by a power system as a heating source to generate steam or to evaporate liquid chemicals or fuels (evaporator), or the use of steam as the heat source for evaporating the liquid chemicals or fuels. Examples of a suitable vaporizer include a steam generator, a heat recovery steam generator (HRSG), a waste heat boiler, an evaporator, an evaporator/mixer, and a liquid chemical or fuel evaporator. The evaporator/mixer configuration of the vaporizer can be used in reformer plants where a liquid chemical or fuel needs to be first evaporated and mixed with a heating medium of steam prior to being introduced to a chemical converter, such as a reforming reactor. According to an optional practice, the vaporizer can be configured so as to perform the combined function of vaporizing and mixing in a single, modular device.

Figure 1A:
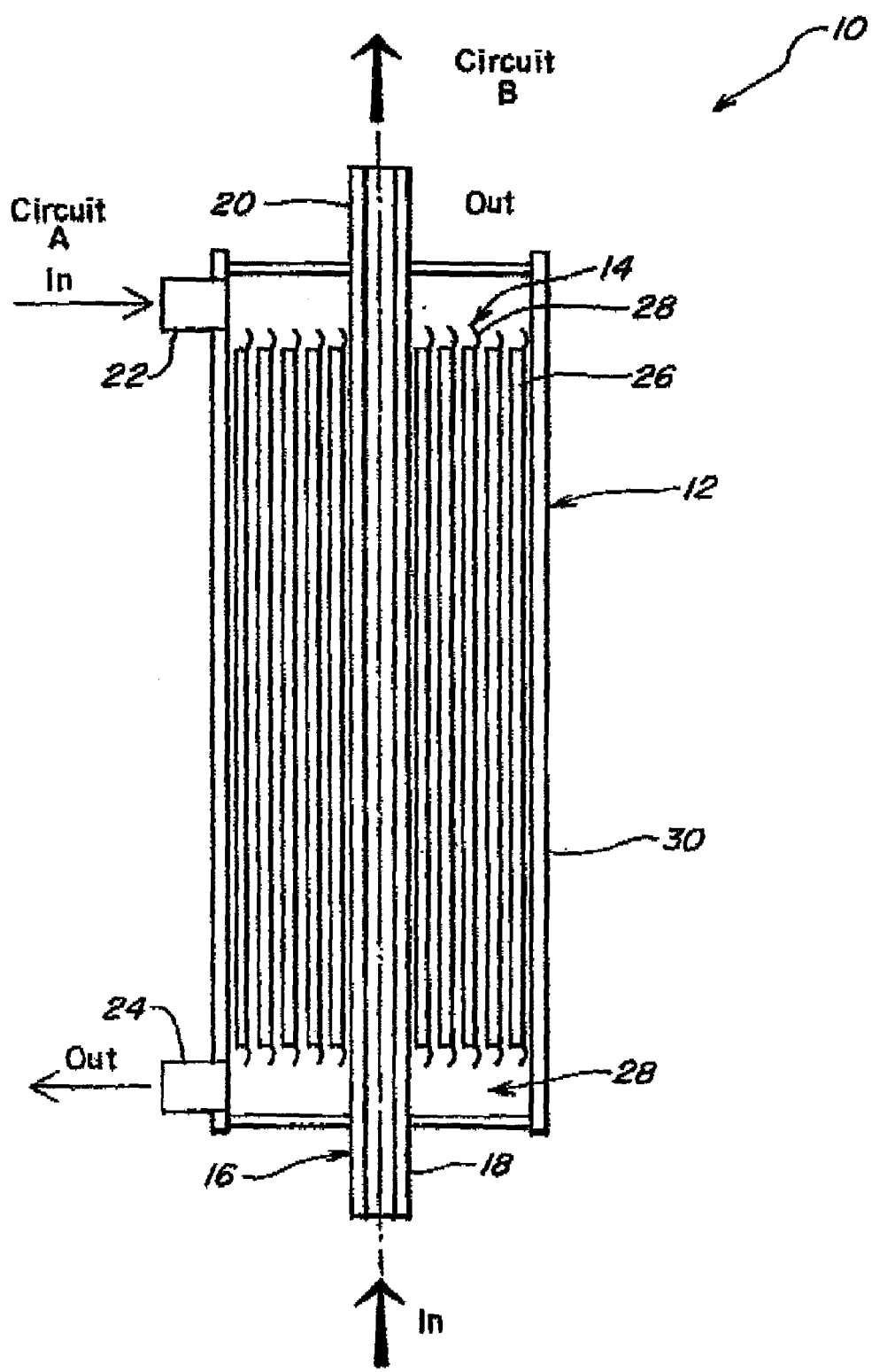
FIG. 1A is a cross-sectional perspective view of a vaporizer according to the teachings of the present invention.

FIG. 1A illustrates one embodiment of the vaporizer of the present invention. The illustrated vaporizer 10 includes a housing 12 defining a chamber 28 that has an inlet 22 and an outlet 24. The housing can have any selected shape or size, and preferably has a cylindrical shape with a diameter of about 12 inches or less. A bundle element 14 is mounted within the chamber 28. As used herein, the term "bundle element" is intended to include any suitable structure for allowing a process fluid to thermally interact with one or more other thermal media in the chamber. The bundle element of the present invention can include any selected number or arrangement of components or parts, and preferably includes one or more heat exchanging surfaces that can have any selected shape or configuration. For example, the bundle element can include a conduit and a multi-sheet layer which can be wrapped around the conduit, as described in further detail below. The multi-sheet layer can comprise at least two sheets forming the heat exchanging surfaces and which define a confined flow volume. The bundle element can also be constructed as a series of tubes as illustrated in FIG. 3B. In this embodiment, the wall of the tubes forms the heat exchanging surface.

The illustrated bundle element of the present invention can optionally be free of a fluid flow baffle that impedes or prevents a fluid from flowing through at least part of the conduit or the overall bundle element. According to another optional practice, the bundle element can include a plurality of surface features that can be arranged in any suitable configuration, design or shape, and can preferably be arranged in rows. Those of ordinary skill will also recognize that the inlet and the outlet can be placed at any suitable locations along the housing other than the positions illustrated in FIG. 1A.

Figure 1B:
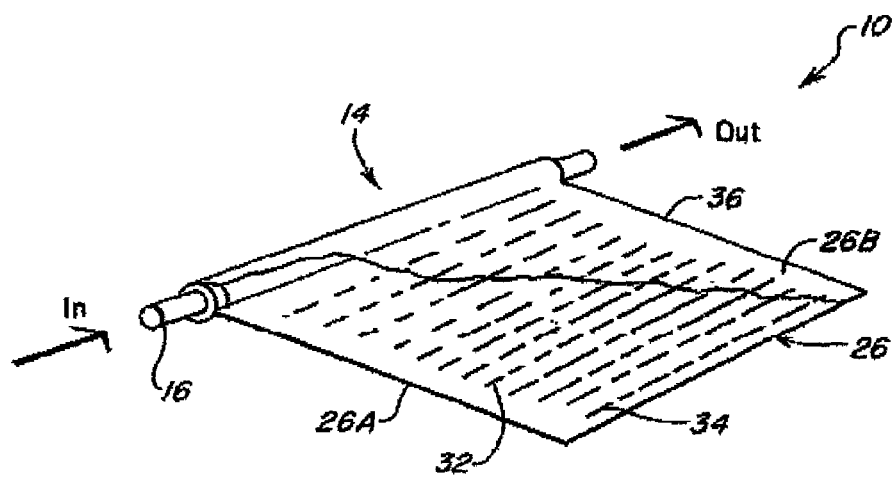
FIG. 1B is a perspective view, partially cut away, of the bundle element of FIG. 1A illustrating the multi-sheet layer and the conduit components thereof.
Figure 1C:
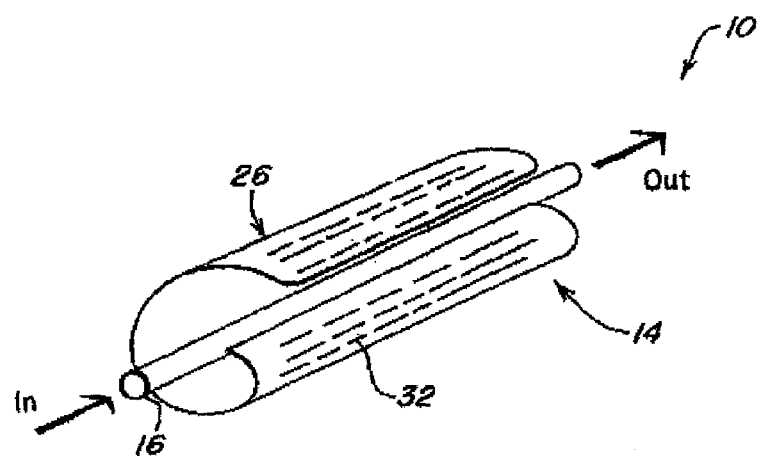
FIG. 1C is a perspective view of the bundle element of FIG. 1B when the multi-sheet layer is wrapped about the conduit.

The illustrated bundle element 14 can include a conduit 16 that passes through the housing 12 and extends between an inlet 18 and an outlet 20. The inlet and outlet do not communicate directly with the chamber 28. Additionally, the bundle element 14 includes structure that forms the heat exchanging surface, such as a multi-sheet layer 26 having sheets 26A and 26B that are disposed in fluid communication with the central conduit 16, as illustrated in FIGS. 1A, 1B and 1C. One or more sheets constituting the multi-sheet layer 26 can include a plurality of generally parallel rows 34 of surface features 32 that provide spacing with an opposed facing sheet to form flow passages. According to one practice, the surface features 32 can be corrugations or dimples, although other configurations and types of surface features can be used. According to one optional practice, the rows 34 are generally parallel to each other. Moreover, the sheets can optionally be free of any type of baffles for preventing or impeding fluid flow within at least or portion of all of the conduit or multi-sheet layer. According to one optional practice, a separate flow spacer element can be can be included within the multi-sheet layer. The flow spacer can be another sheet, or any other suitable structure for separating two or more sheets. Those of ordinary skill will also recognize that the surface features themselves can operate as a spacer element.

The sheets 26A and 26B of the multi-sheet layer 26 can be sealed to each other, such as by welding, along one or more selected outer edges, such as edge 36, to form a fluid-tight confined volume or space between the sheets. This volume or space can be disposed in fluid communication with an inner lumen of the conduit 16 by one or more apertures formed along the length thereof. The multi-sheet layer 26 can then be wrapped around the conduit 16, as illustrated in FIGS. 1C and 3C. The resulting bundle element 14 can then be installed or mounted within the housing 12 according to known techniques. The resultant vaporizer can be optionally oriented in a vertical position during use and a process fluid is introduced to the conduit 16 from the bottom of the vaporizer 10. Those of ordinary skill will readily recognize that any selected number of sheets can be employed when constructing the bundle element 14. Moreover, those of ordinary skill will readily recognize that the conduit can be coupled, attached or permanently affixed to the multi-sheet layer 26 by known fastening techniques, such as by welding. The conduit can also be an integral part of the wrapping multi-sheet layer. The housing 12, conduit 16 and multi-sheet layer 26 can be formed of any suitable material, such as steel or nickel containing compounds or alloys suitable for high temperature applications. The latter material exhibits better corrosion resistance properties.

The flow passages formed by the surface features 32 within the multi-sheet layer 26 and the conduit 16 form a fluid flow circuit B. The gaps or spaces formed between facing wraps of the multi-sheet layer 26, when wrapped about the conduit, in conjunction with the chamber 28, the inlet 22 and the outlet 24 of the housing 12, form a fluid flow circuit A.

In operation, the vaporizer is preferably vertically positioned and any suitable heating medium, such as a hot exhaust medium or steam, can be introduced to the inlet 22 disposed at the top portion of the housing 12. As illustrated in FIG. 1A, introducing the heated medium to the top of the housing 12 forms a counter flow heat exchanging scheme, which is a desired approach for superheating a vapor. The heating medium operates as a heat source for the vaporizer. The heating medium passes through the fluid flow circuit A, namely through the chamber 28 and the gaps or spaces formed between the facing wraps of the multi-sheet layer 26 to the outlet 24. Any suitable process fluid, such as water, can be introduced to the inlet 18 of the conduit 16, which is positioned at the bottom of the vaporizer. The water flows along the interior of the conduit, and then passes through the apertures into the multi-sheet layer 26. The multi-sheet layer has formed therein fluid flow passages that enable the conduit to maximize, optimize or increase the total surface area of the bundle element 14 that can function as the heat exchanging surface. The water being vaporized in the multi-sheet layer then returns to the interior of the conduit through the apertures and exits at the conduit outlet 20. The water is heated when passing through the fluid flow circuit B by the heating medium flowing along the bundle element in fluid flow circuit A. The sheets layer 26 of the bundle element 14 serves as the heat transfer surface of the overall vaporizer 10. Depending upon the temperature of the heating medium passing through the chamber 28 of circuit A, the water passing through the bundle element 14 can be converted into steam. The illustrated vaporizer 10 discharges the steam through the housing outlet 24.

The illustrated vaporizer 10 when vertically positioned during use allows the liquid introduced to the bundle element 14 to be distributed along a bottom portion thereof by gravity. The liquid forms a pool within the multi-sheet layer 26. When the pooled liquid is heated by the heating medium flowing through circuit A, the liquid is converted into a vapor without discharging unconverted liquid back into the conduit 16, thus achieving a pool boiling effect. Moreover, the configuration of the bundle element of the present invention is arranged so as to have a large liquid surface area thereby avoiding the corresponding unwanted occurrence of vapor flash phenomena.

Moreover, the vaporizer 10 of the present invention is a relatively miniature vaporizer having relatively small dimensions that allows the vaporizer to be efficiently and easily integrated with modern power systems and components.

Those of ordinary will readily recognize that the assignment of circuit A and circuit B as describe above with respect to the heating medium and process fluid are for illustration purposes only. The flow assignment of the two circuit can be reversed to achieve other intended purposes.

Figure 2A:
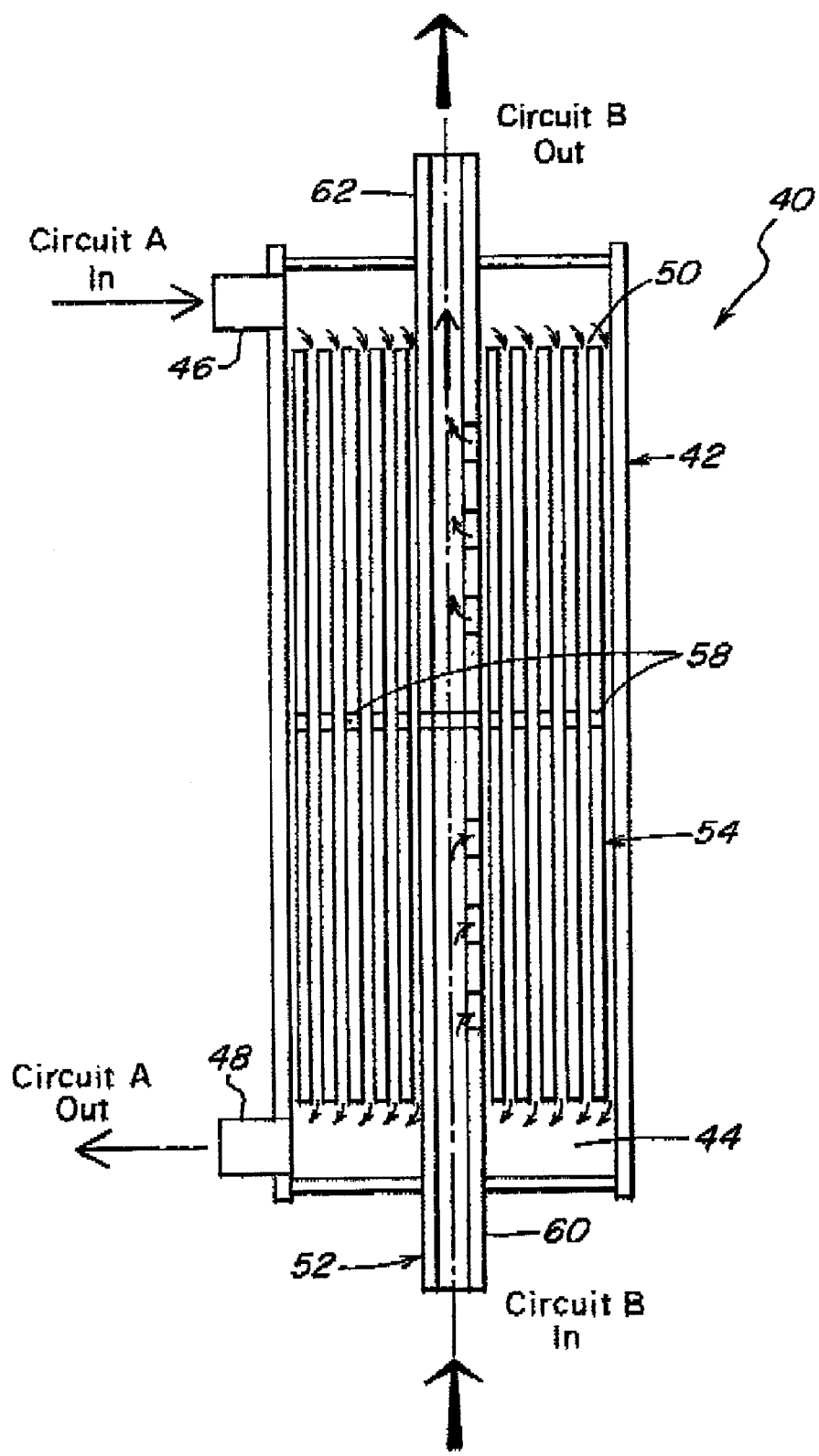
FIGS. 2A through 2C are varying views of a conventional heat exchanger employing a baffle and non-parallel surface features formed on a sheet.
Figure 2B:
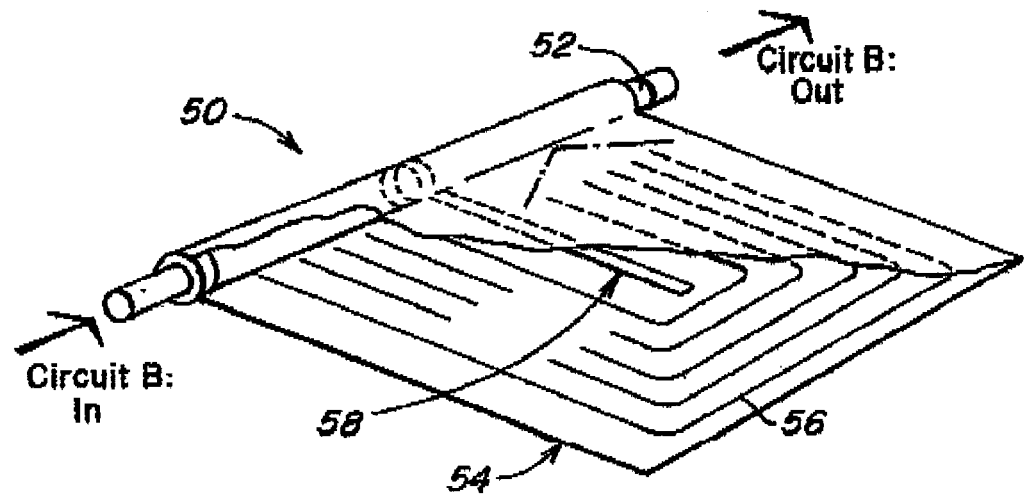
Figure 2C:
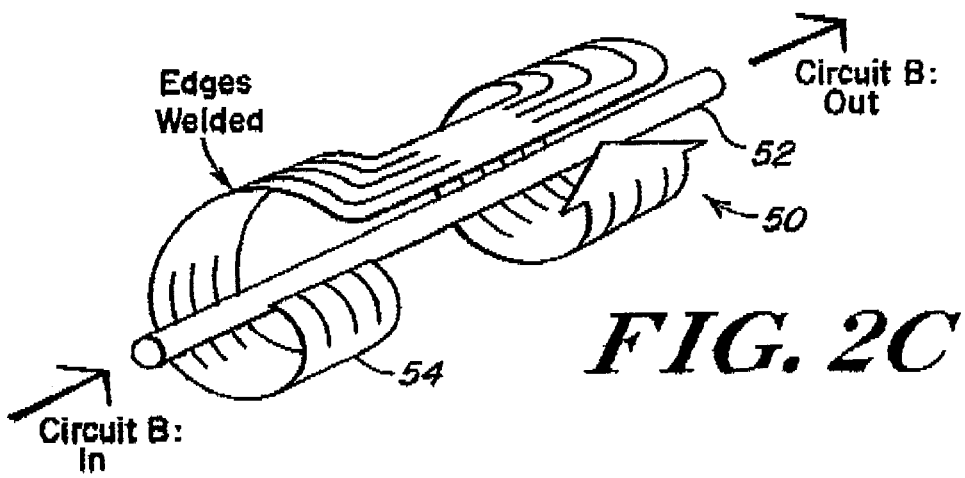

FIGS. 2A through 2C illustrate a conventional heat exchanger manufactured by Spirec N. A., U.S.A. The illustrated heat exchanger 40 includes a vessel 42 defining a chamber 44 that has an inlet 46 and an outlet 48. A spiral bundle 50 is mounted within the chamber 44. The illustrated spiral bundle 50 includes a conduit 52 and a sheet element 54. The sheet element 54 can include a plurality of surface features. The sheet element 54 includes a baffle 58 formed therealong. The baffle operates as a flow impediment to fluid flowing along the sheet element in order to obtain a desired flow direction. The flow path of the fluid as it traverses the sheet element 54 is illustrated by the flow path arrows 56. The sheet element 54 can include a pair of sheets that are welded along the edges. The sheet element 54 is then wrapped around the conduit 52 in the manner illustrated in FIG. 2C to form an essentially U-shaped fluid flow circuit B. The spiral bundle 50 is installed in the vessel 42.

During operation, a fluid, such as water, is introduced to the inlet 60 of the conduit 52. The water flows into the sheet element 54, and travels along a relatively U-shaped route to reach the conduit outlet 62. The surface feature, baffle 58, formed on the sheet element 54 obstructs the collection of steam therein, and hence promotes or facilitates the unacceptable phenomenon of vapor flashes that force heated water to be discharged with the vapor at the conduit outlet 62. This results in improper operation of the heat exchanger 40. Consequently, the baffle plate causes the unwanted vapor flash phenomenon.

The vaporizer of the present invention, on the other hand, does not employ a baffle, and can be constructed as shown in FIGS. 1A, 1B and 1C as a miniature cylinder of about 2 inches in length and about 1 inch in diameter. For increased heat exchanging capacity, multiple vaporizers can be used with the input liquid feeds connected in parallel and positioned relatively level to ensure that the pool boiling effect is uniformly maintained throughout the group of vaporizers. By parallel connection, the vaporizers are coupled to a common source, such as a fluid manifold that supplies liquid to the each of the vaporizers. Those of ordinary skill will readily recognize that other types of connections can be employed. For example, the vaporizers can be connected in series, such that the output of one vaporizer serves as the input for another vaporizer, which can serve as a superheater. In this arrangement, the vaporizer output can be introduced either to the conduit or the chamber of the next vaporizer. For example, a hot exhaust from a chemical converter can be employed as the heating medium in a vaporizer to vaporize a liquid, such as water, to form a water vapor. Subsequently, the water vapor can be introduced to another vaporizer operating as an evaporator/mixer. In this arrangement, a liquid fuel is evaporated therein and then mixed with the water vapor to form an output mixture. The output mixture is then supplied to the same or to another chemical converter, such as a reformer. This arrangement provides an effective means for waste heat recovery in a power, thermal or chemical plant. Alternatively, each vaporizer can be coupled to a dedicated input liquid or medium source. The present invention also contemplates employing combinations of the foregoing approaches and arrangements.

Moreover, the fluid flow circuit A of the present invention essentially operates as a heat source by introducing a heating medium, such as a hot exhaust or steam, to the housing 12. The fluid flow circuit B introduces a process fluid or liquid to the vaporizer. When disposed in a vertical position, the process fluid or liquid is fed from an inlet that is positioned at a bottom of the housing. During operation, the process fluid or liquid fills the lower portion of the fluid flow circuit B by gravity. The process fluid or liquid is heated (e.g., boiled) by the heating medium passing through the fluid flow circuit A. Vapor is collected above the liquid in the bundle element 14, and eventually is discharged at the conduit outlet 20. This vaporizer hence assumes a vertical operating position, allowing gravity to spread out the liquid to the lower portion of the bundle element, thus achieving full contact of the input liquid with the heat transfer surfaces. The unobstructed fluid passages (absence of a baffle) formed in the multi-sheet layer 26 by the surface features 32 ensures simple vapor phase collection and delivery, thus eliminating the unacceptable phenomenon of vapor flash.

The above assignments of heating medium and process fluid respectively to the circuit A and the circuit B is preferred. The reversed assignments will result in a less effective vaporization of the process fluid.

Figure 3A:
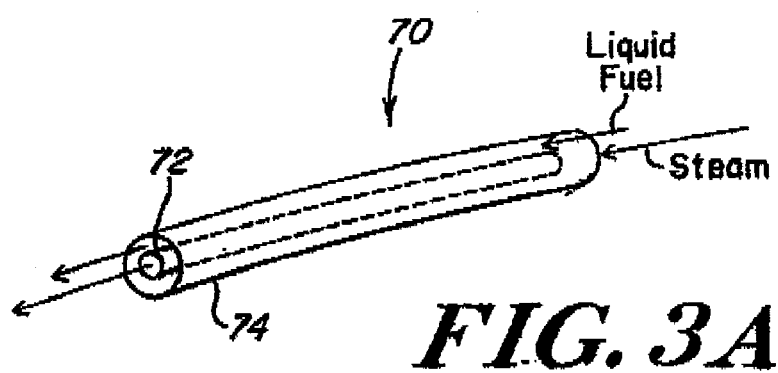
FIG. 3A is a perspective view of an alternate embodiment of the vaporizer of the invention configured as a co-axial evaporator/mixer.
Figure 3B:
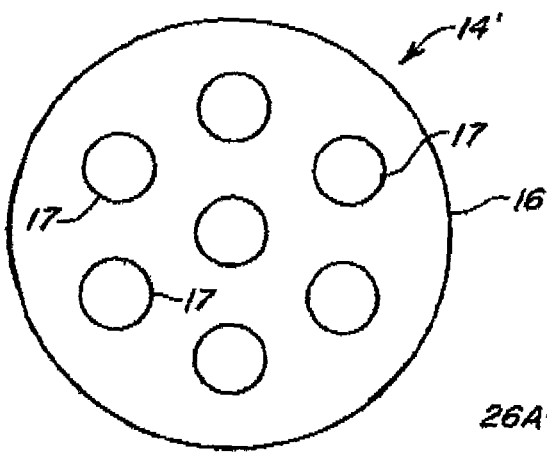
FIG. 3B is a cross-sectional view of an alternate embodiment of the bundle element of the present invention.
Figure 3C:
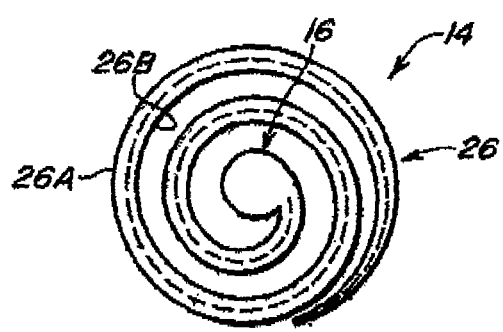
FIG. 3C is a cross-sectional view of the bundle element of FIGS. 1A–1C illustrating the multi-sheet layer wrapped around the conduit.

FIG. 3A illustrates an alternate embodiment of the vaporizer according to the teachings of the present invention. The illustrated vaporizer 70 is adapted and configured to operate as a simple evaporator that is used to convert a liquid chemical or fuel into a gaseous chemical or fuel. The vaporizer comprises a pair of concentric or coaxial tubes 72 and 74. For example, a first liquid medium, such as a liquid chemical or fuel, is introduced into the outer tube 74, and steam or another type of heating medium is introduced into the inner tube 72. The heating medium heats the liquid chemical passing through the outer tube to a degree sufficient to convert the chemical into a gaseous phase. Specifically, a wall of the inner tube forms a heat exchanging surface for exchanging heat. Typically, in a reformer application, steam is used as the heating medium for evaporating the liquid chemical into a gaseous phase. The steam, as a reforming agent, is then mixed with the chemical or fuel prior to entering the reformer for further reforming action.

FIG. 3B illustrates an alternate embodiment of the bundle element 14' of the present invention. The illustrated bundle element 14' can be employed in place of the bundle element 14 in any of the vaporizers shown and described herein, such as vaporizer 10 of FIG. 1. The illustrated bundle element 14' includes structure that forms heat exchanging surfaces for exchanging heat between a heating medium and a process fluid. The bundle element 14' includes a conduit 16' that surrounds a plurality of fluid carrying elements, such as tubes 17'. The tubes 17' are adapted to carry the heating medium, and the interior of the conduit 16' is adapted to carry the process fluid, similar to the multi-sheet layer 26. The tubes 17' can hence be disposed in fluid communication with the chamber of the vaporizer housing at the top and bottom portions of the tubes in order to be able to heat the input process fluid flowing through the conduit 16' in the manner described above. Hence, the walls of the tubes form the heat exchanging surfaces. The conduit 16' can be attached, coupled or connected to the top and bottom portions of the vaporizer, which can be configured as header plates. Hence, the header plates, the conduit 16' and the outer surface of the tubes 17' define the flow volume or space for the process fluid. Although illustrated as tubes, the fluid carrying elements can have any selected shape. Those of ordinary skill will readily recognize that the process fluid can pass through the tubes 17' rather than through the conduit 16'. The overall operation of the vaporizer of the present invention when employing the bundle element 14' is as described above and below.

Figure 4:
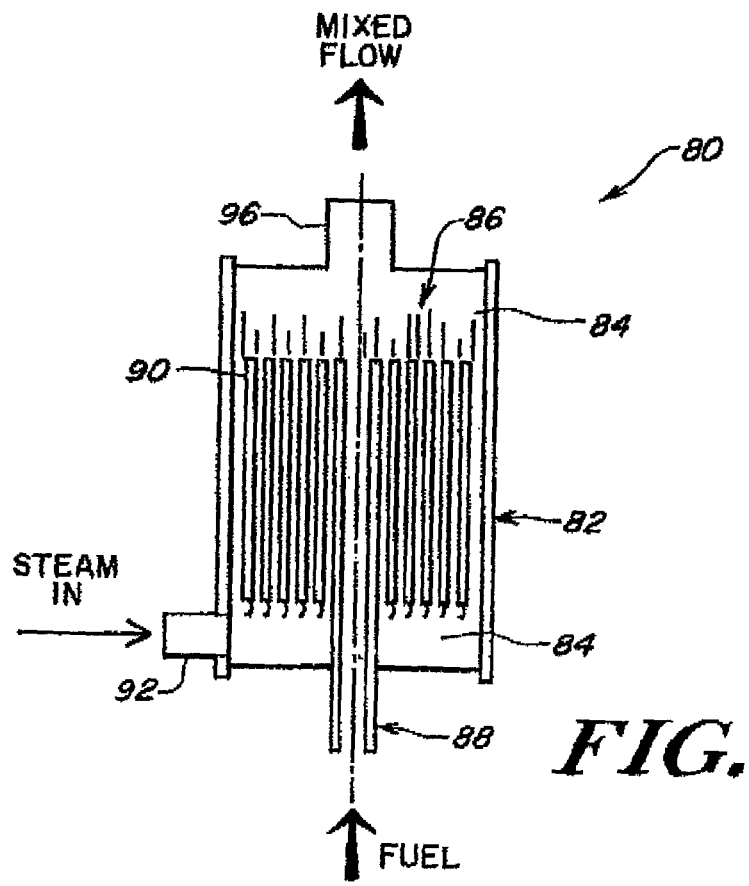
FIG. 4 is a partially cut-away perspective view of another embodiment of the vaporizer of the invention configured as an evaporator/mixer

As illustrated in FIG. 4, the vaporizer of the present invention can be configured so as to function both as an evaporator and a mixer (evaporator/mixer configuration). The illustrated vaporizer 80 is similar in configuration and construction as the vaporizer 10 of FIGS. 1A through 1C with minor modifications. The vaporizer 80 includes a collection housing 82 that defines a chamber 84 that is sized to accommodate a bundle element 86. The housing 82 includes an entrance port or inlet 92 for receiving a heating medium, such as steam, and an exit port or outlet 94 for discharging a mixed flow.

Similar to the vaporizer 10 of FIG. 1A, the illustrated bundle element 86 includes a multi-sheet layer that is connected to and wrapped about a conduit 88 to provide heat exchanging surfaces 90. The multi-sheet layer, when wrapped, forms spaces between the facing wraps forming flow passages therebetween. According to the illustrated embodiment, the multi-sheet layer of the bundle element 86 is sealed along one or more selected edges, such as the bottom edge, when disposed in a vertical position, and remains unsealed along another edge, such as the top edge when disposed in the vertical position. The heating medium introduced to the chamber 84 through the inlet 92 passes through the spaces between the facing wraps forming a fluid flow circuit A. The multi-sheet layer includes a plurality of surface features forming flow passages therein. The conduit 88 and the flow passages in the multi-sheet layer form fluid flow circuit B. The multi-sheet layer if desired can be devoid of any baffles. The surface features can be optionally linear in shape, and can optionally be generally parallel to each other. Those of ordinary skill will recognize that any suitable surface feature configuration, design and shape can be employed.

The bundle element 86 is essentially similar to the bundle element 14 of vaporizer 10 except that a portion of the bundle element (wrapping multi-sheet layer and conduit) is removed. Specifically, the illustrated vaporizer 80 is constructed to include a truncated version of the bundle element 14. The unsealed edge of the multi-sheet layer allows an input process fluid, such as a liquid fuel, entering the conduit 88 and passing through and out of the bundle element 86 at the unsealed edge to mix with the heating medium introduced to the chamber 84 through the inlet 92. Hence, the vaporizer 80 heats and evaporates the process fluid passing through the bundle element 86 with the heated medium in the chamber 84 to produce a vapor that is discharged into the chamber 84. Concomitantly, the vaporizer functions as a mixer by mixing the gaseous output of the bundle element 86 with the heating medium (e.g., steam) in the chamber 84 to form an output mixture. The output mixture can then be introduced to any selected system component, such as a chemical converter.

The housing 82, the conduit 88 and multi-sheet layer of the bundle element 86, can be formed of a suitable material, such as steel or nickel alloy for high temperature applications. The latter material provides better corrosion resistance to potential chemical attacks. The vaporizer 80 can be operated with the unsealed edge along the top portion of the bundle element (e.g., disposed vertically upwards) or the housing disposed vertically upwards and with the process fluid and the heating medium inlets located along a bottom portion of the vaporizer. This allows the liquid introduced to the bundle element 86 to be distributed by gravity to form a pool within the fluid flow circuit B. The pooled liquid can achieve a pool boiling effect when heated by the heating medium in the fluid flow circuit A.

Moreover, due to the small flow spacing and the alternating media distribution in the bundle element 86, the media flowing in the fluid flow circuits A and B can readily and easily mix within the chamber 84 at the truncated opening of the bundle element 86. The above design allows effective evaporation and mixing to be achieved within a single, integrated, compact vaporizer. The vaporizer 80 of the present invention can be constructed as a relatively small cylindrical device having a length of about 2 inches and a diameter of about 1 inch. Those of ordinary skill will readily recognize that the vaporizer or the housing can have any selected shape. For increased capacity, the multiple vaporizer units can be coupled to separate fluid sources or to the same fluid source, which provides the fluid at all the units (parallel configuration). Moreover, the vaporizers can be vertically oriented or positioned to ensure that the liquid introduced to the bundle element 86 is forced by gravity to a bottom portion of the bundle element, where it can be heated, boiled and converted to a gas (evaporated) by the heating medium to achieve a pool boiling affect.

Figure 5:
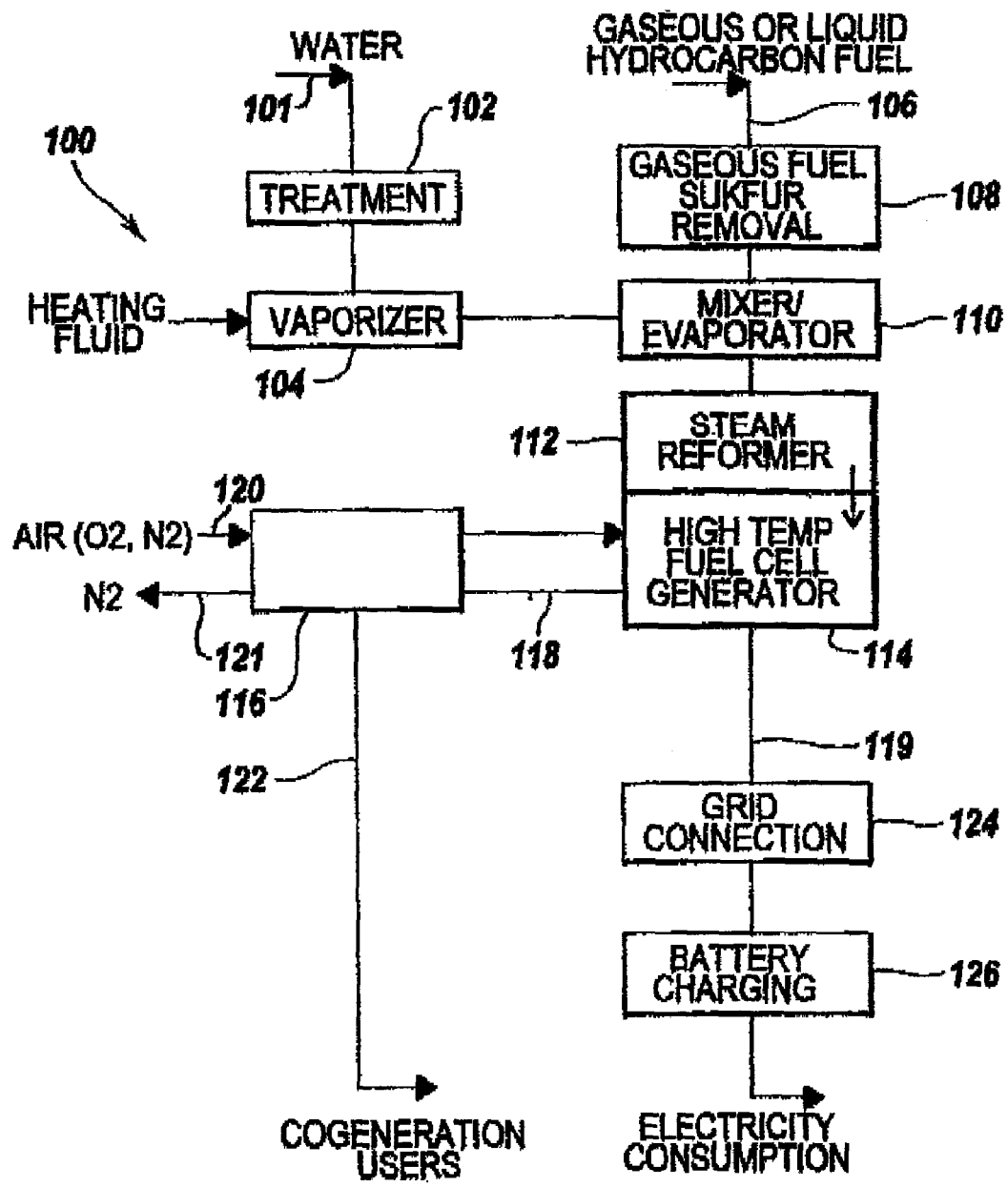
FIG. 5 is a schematic block diagram of an electrochemical cogeneration and co-production system that utilizes one or more vaporizers of the present invention.

FIG. 5 illustrates an electrochemical cogeneration system 100 employing multiple vaporizers. Those of ordinary skill will readily recognize that any suitable number of vaporizers can be employed. The illustrated system 100 is intended to be simply illustrative of the operation and interrelationship of certain components of the foregoing system. Although illustrated with multiple different stages and components, the system can have any selected number of components and arrangements thereof. The illustrated arrangement is merely illustrative and is not intended to be construed in a limiting sense.

A reforming agent 101, such as water, is introduced to a treatment stage 102. The treatment stage 102 treats the water, such as to deionize it, and produces a treated output that is introduced to a vaporizer 104. A heating medium supplied from any conventional source, typically the hot exhaust 121 of the system 100, is introduced to the vaporizer 104 and operates to heat the treated water therein. Specifically, the vaporizer 104 heats the water with the thermal energy associated with the heating medium and converts the treated water to steam. The steam is then conveyed to a second vaporizer 110 that can be optionally configured as an evaporator/mixer. The steam generated by the vaporizer 104 serves as the heating medium for the second vaporizer 110.

A fuel 106 is introduced to a fuel treatment stage 108 in order to remove selected impurities, such as sulfur. The treated fuel is then introduced to the second vaporizer 110 which functions as a evaporator/mixer. The vaporizer 110 evaporates the fuel (when liquid) to form a fuel vapor and then mixes the fuel vapor with the steam supplied from the first vaporizer. The fuel/steam mixture is then introduced to a chemical converter, such as the reformer 112. Those of ordinary skill will readily recognize that many different combinations, numbers, arrangements, and types of vaporizers can be employed to attain a reactant suitable for use with a chemical converter. Moreover, different types of mixers can be employed in place of the vaporizer 110 if an evaporating function is not desired, such as when a gaseous fuel is used. The mixer can hence be any device suitable for mixing together two or more media. Embodiments of the chemical converters and the mixers suitable for use with the present invention are shown and described in International Patent Application Serial No. PCT/US01/48813, entitled MULTI-FUNCTION ENERGY SYSTEM OPERABLE AS A FUEL CELL, REFORMER, OR THERMAL PLANT, by the inventor hereof, the contents of which are herein incorporated by reference. The treatment stages 102 and 108 may also be configured to perform one or more of the following functions, including water deionization using a resin packed bed or a reverse osmosis technique; fuel desulfurization using absorbers. Other treatment stages which can be connected to the vaporizer or the evaporator/mixer of the present invention may perform the following functions: producing hydrogen from carbon monoxide using a water shift catalyst bed; and purifying hydrogen using a molecular sieve absorber of CO, $CO_2$, and $H_2O$ in a pressure or temperature swing absorption processor. The treatment stage of the present invention can have any selected shape or size, and can be configured to have a cylindrical shape having a diameter of 12 inches or less.

The illustrated reformer 112 preferably reforms the fuel in the presence of water vapor, the reforming agent, and a catalyst to create an output medium having one or more of $H_2O$, $H_2$, CO, $CO_2$, and possibly S. The hydrogen and/or other components of the output medium can be introduced to a second chemical converter, such as the fuel cell 114. The fuel cell 114 electrochemically converts the reformed fuel in the presence of an oxidant, such as air 120, into electricity while concomitantly producing an exhaust or output medium 118 primarily comprised of $H_2O$ and $CO_2$. The fuel cell output medium 118 can be a high temperature medium that can be transferred to any selected device or bottoming plant 116, such as to a gas turbine or an HVAC unit. The air 120 can be directly supplied to the fuel cell or can be supplied to the fuel cell through a gas turbine assembly 116 or through a separate compressor. The output 122, electricity or conditioned medium from the bottoming plant assembly 116 can also be used in any suitable manner known to those of ordinary skill. The electricity 119 generated by the fuel cell can be extracted and used for any desired purpose. For example, the electricity 119 can be supplied to an electrical utility grid or connection 124 and/or can be used to charge a battery 126, such as the type employed in electric vehicles.

Those of ordinary skill will readily recognize that the vaporizer or evaporator/mixer housing can have any selected shape, configuration, or size. In pressurized applications, the vaporizer housing, the evaporator/mixer housing and any treatment stage coupled thereto can have a cylindrical configuration, with a diameter of about 12" or less in order to form a modern compact energy system.

Figure 6:
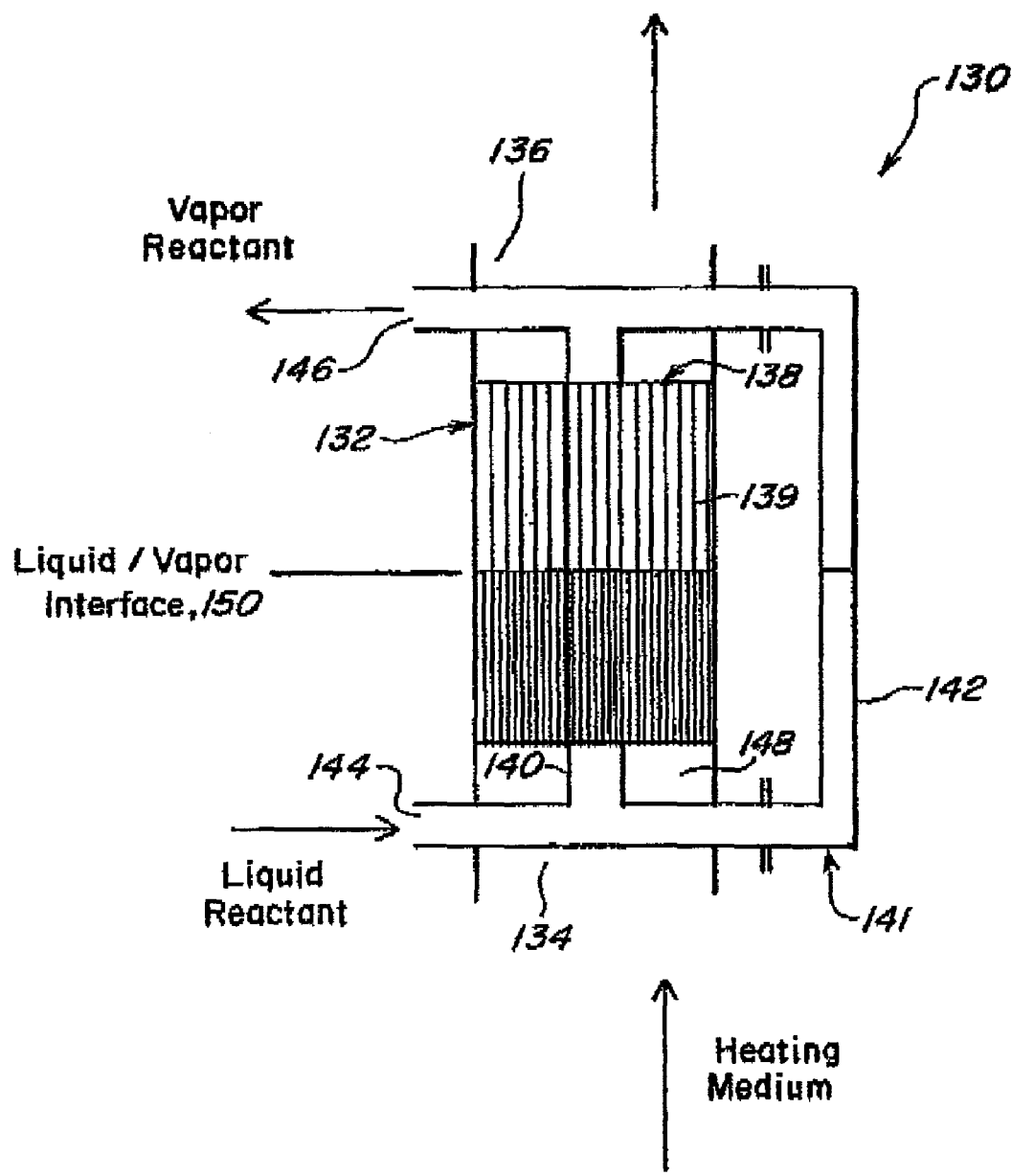
FIG. 6 is a partially cut-away perspective view of still another embodiment of the vaporizer according to the teachings of the present invention.

FIG. 6 illustrates another embodiment of the vaporizer of the present invention. The illustrated vaporizer 130 includes a housing 132 defining a chamber 148 that has an inlet 134 and an outlet 136. A bundle element 138 is mounted within the chamber 148. The illustrated bundle element 138 can include a conduit system 141 that at least partially passes through the housing 132. The illustrated conduit system 141 includes a first conduit portion 140 that is positioned within the chamber 148, and a second conduit portion 142 that is disposed on the outside of the housing 132. Each of the first and second conduit portions 140 and 142 extend between an inlet 144 and an outlet 146. The inlet 144 and the outlet 146 do not communicate directly with the chamber 148.

The bundle element 138 can optionally be configured similar or identical to the bundle elements of the invention described above, or similar or identical to known bundle elements. For example, the bundle element 138 can include a multi-sheet layer 139 that is disposed in fluid communication with the conduit. The multi-sheet layer can include surface features that form flow passages therein. The multi-sheet layer can be wrapped about the conduit to form the bundle element 138. The use of baffles are optional, although it is preferred not to use them.

In operation, the vaporizer 130 is preferably vertically positioned and any suitable heating medium, such as a hot exhaust medium or steam, can be introduced to the inlet 134 disposed at a bottom portion of the housing 132. The heating medium operates as a heat source for the vaporizer 130. The heating medium in the chamber flows about and through spaces formed between facing wraps of the multi-sheet layer 139. Hence, the multi-sheet layer 139 of the bundle element functions as an extended heat exchanging surface to exchange heat between a process fluid with the heating medium. Any suitable process fluid, such as a liquid reactant, can be introduced to the inlet 144 of the conduit, which is positioned at the bottom portion of the vaporizer 130. The liquid flows into the first and second conduit portions 140 and 142, and into the multi-sheet layer 139 of the bundle element 138. The liquid is converted, evaporated or vaporized within the first conduit portion 140 and the multi-sheet layer 139 so as to form an output vapor, which is discharged through the outlet 146. The liquid process fluid and the vaporized process fluid form a liquid-vapor interface 150 within the first conduit portion 140 and the multi-sheet layer 139 (e.g., within the bundle element). The level of the liquid within the bundle element and/or the first conduit portion is registered in the second conduit portion 142 due to gravity. Hence, the second conduit portion 142 operates as a liquid gauge or display to enable a user to determine the liquid level within the bundle element 138 and hence within the vaporizer. The second conduit portion can be made of material such as glass for liquid level visualization or of other level detection means. Moreover, the second conduit portion 142 need not be part of the bundle element.

Furthermore, the illustrated vaporizer 130 when vertically positioned during use allows the process fluid introduced to the bundle element 138 to be distributed along a bottom portion thereof by gravity. The liquid forms a pool within the multi-sheet layer 139. When the pooled liquid is heated by the heating medium flowing through the chamber 148, the liquid is converted into vapor without discharging unwanted liquid back into the conduit, thus achieving a pool boiling effect. The bundle element of the present invention avoids the corresponding unwanted occurrence of vapor flash phenomena where liquid is accidentally discharged through the outlet 146.

Furthermore, the illustrated vaporizer 130 can be constructed as an evaporator/mixer by employing a truncated version of the bundle element 138. The resultant unsealed edge of the multi-sheet layer 139 allows an input process fluid, such as a liquid fuel, entering the first conduit portion 140 and passing through and out of the bundle element 138 at the unsealed edge to mix with the heating medium introduced to the chamber 148 through the inlet 134. Hence, the vaporizer 130 heats and evaporates the process fluid passing through the bundle element 138 with the heated medium in the chamber 148 to produce a vapor that is discharged into the chamber 148. Concomitantly, the vaporizer functions as a mixer by mixing the gaseous output of the bundle element 138 with the heating medium (e.g., steam)in the chamber 148 to form a output mixture. The output mixture can then be introduced to any selected system component, such as a chemical converter.

Figure 7:
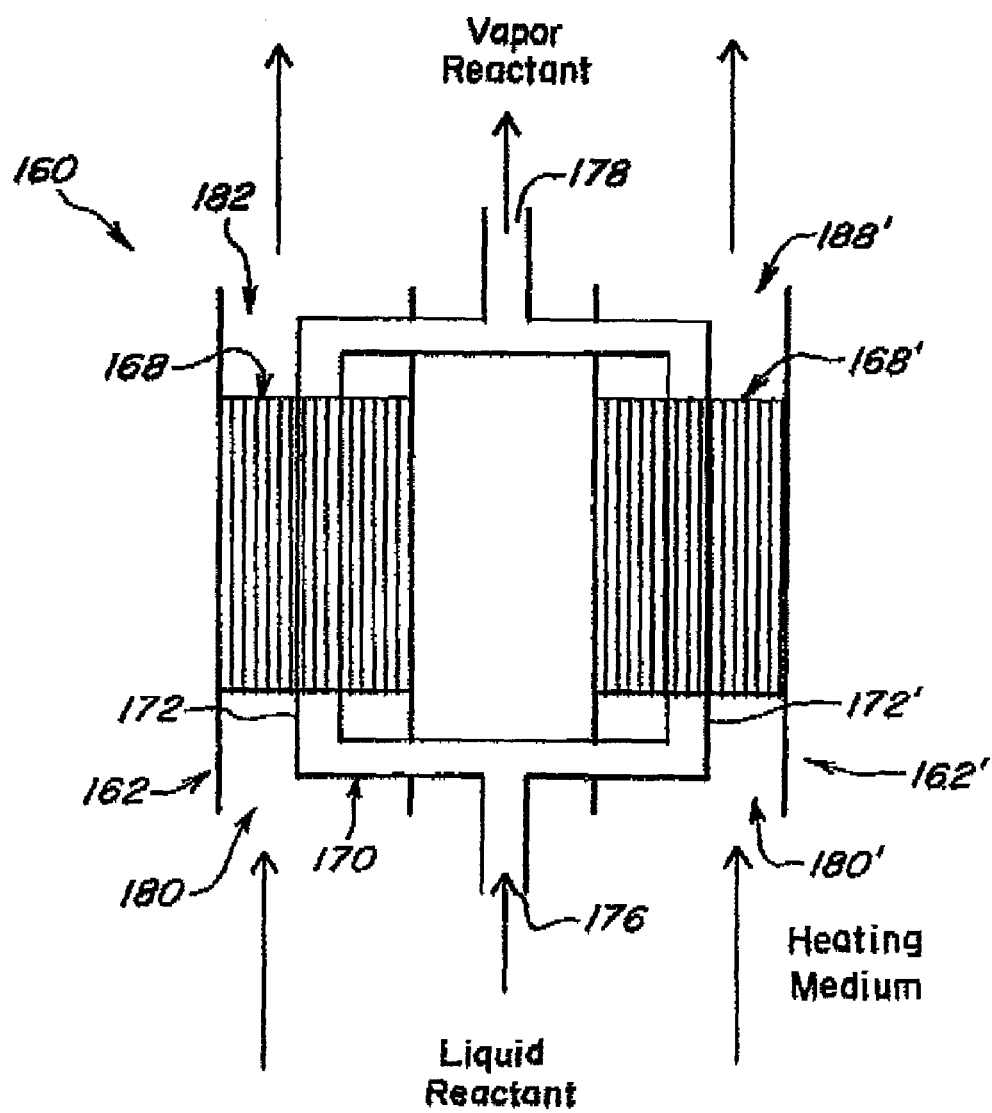
FIG. 7 is a perspective view of a system employing multiple vaporizers fluidly connected in a parallel with each other according to the teachings of the present invention.

FIG. 7 is a perspective view of a system employing multiple vaporizers fluidly connected in parallel with each other according to the teachings of the present invention. The illustrated system 160 employs for example a pair of vaporizers 162 and 162'. The vaporizers 162 and 162' employ bundle elements 168 and 168', respectively. Notwithstanding the fluid arrangement of the illustrated system, the bundle elements can be any of the bundle elements described herein. Those of ordinary skill will readily recognize that any selected number of vaporizers can be employed.

As shown, the vaporizers 162 and 162' are fluidly coupled in parallel with each other. Specifically, an input process fluid, such as a liquid reactant, is introduced to the conduit system 170. The conduit system 170 includes a pair of conduits 172 and 172' that are coupled to a common inlet 176 and a common outlet 178 via any suitable structure sufficient to distribute the process fluids, such as fluid manifolds. The process fluid flows into the inlet 176, and then concomitantly flows through each of the separate conduits 172 and 172' in a parallel manner. The conduits 172 and 172' form part of the bundle elements of the present invention. The thermal changes and flow patterns imposed upon the liquid once introduced to the bundle element have been described above and need not be repeated herein.

In operation, the vaporizers 162 and 162' are vertically positioned and the heating medium is introduced to the inlet 180 of the vaporizer 162 and the inlet 180' of the vaporizer 162'. The heating medium operates as a heat source for the vaponzers. The process fluid is introduced to the common inlet 176 of the conduit system 170. The process fluid flows into the bundle elements 168 and 168', and specifically into the conduits 172 and 172'. The liquid is converted, evaporated or vaporized within the bundle elements so as to form a vapor reactant, which is discharged from both the conduits 172 and 172' through the common outlet 178. The heating medium exits the vaporizers at the outlets 182 and 182'. According to one practice, the heating medium has a temperature at the inlet that is higher than the temperature at the outlet.

The heating medium exiting the vaporizer outlets 186 and 186' can be captured by any suitable device for subsequent use or can be vented or released to the ambient environment. The vapor reactant exiting the common outlet 178 can be transferred or conveyed to one or more additional vaporizers or chemical converters, or to one or more other energy or power system components, or can be stored in a suitable storage container.

Figure 8:
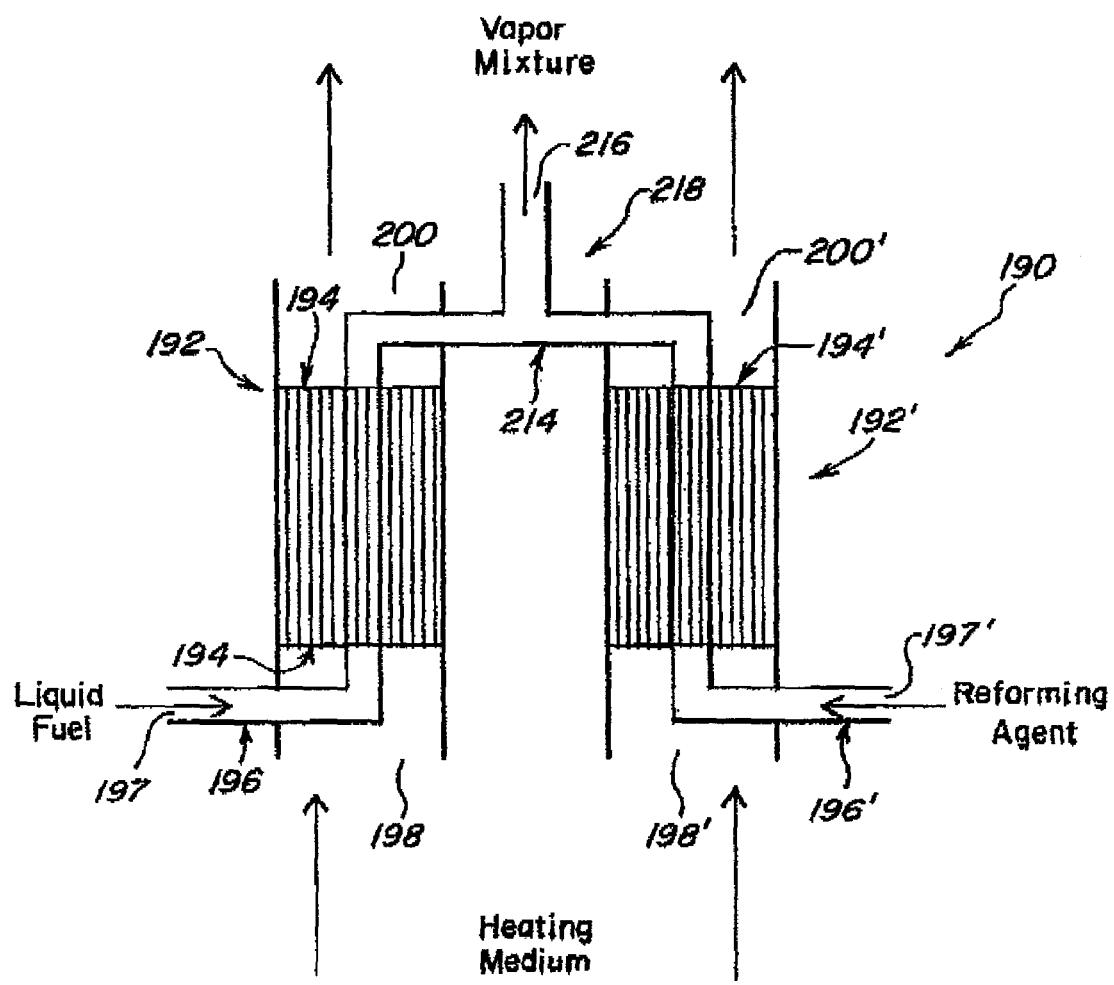
FIG. 8 is a perspective view of another embodiment of a system employing multiple vaporizers fluidly connected in parallel with each other for processing a different fluid and for mixing the fluids before exiting the system.

FIG. 8 is a perspective view of another embodiment of a system 190 employing multiple vaporizers according to the teachings of the present invention. The system 190 employs for example a pair of vaporizers 192 and 192' that are also fluidly connected in parallel with each other. In this embodiment, the vaporizer 192 is configured to evaporate a first process fluid, the vaporizer 192' is configured to vaporize a second process fluid, and the conduit system 218 is configured to mix the output streams of the vaporizers 192 and 192'. The illustrated vaporizers 192 and 192' employ bundle elements 194 and 194', respectively. Notwithstanding the process fluid arrangements of the illustrated conduit system 218, the bundle elements can be any of the bundle elements described herein. Those of ordinary skill will readily recognize that any selected number of vaporizers can be employed. Further, the vaporizers can be configured to thermally act upon the input process fluids in ways different than those set forth herein.

As shown, the vertically positioned vaporizers 192 and 192' are fluidly coupled in parallel with each other. Specifically, the conduit system 218 includes a conduit 196 and a conduit 196', both of which are connected to an intermediate connecting conduit 214. The conduits 196 and 196' form part of the bundle elements. A first process fluid, such as a liquid fuel, is introduced to the inlet 197 of the conduit 196. Likewise, a reforming agent, such as water, is introduced to the inlet 197" of the conduit 196'. The thermal changes and flow patterns imposed upon the liquid fuel and reforming agent once introduced to the bundle elements 194 and 194' have been described above in connection with the other embodiments and need not be repeated.

The liquid fuel introduced through the inlet 197 into the bundle element 194 is vaporized by the thermal energy associated with the heating medium introduced to the inlet 198 of the vaporizer 192. Similarly, the reforming agent introduced through the inlet 197' into the bundle element 194' is evaporated by the thermal energy associated with the heating medium introduced to the inlet 198' of the vaporizer 192'. The heating medium operates as a heat source for the vaporizers. The liquids in the bundle elements 194 and 194' are converted, evaporated or vaporized therein to form vapors, which are discharged from the conduits 196 and 196' to the common conduit portion 214. For example, the vaporizer 192 evaporates the liquid fuel to form a fuel vapor, and the vaporizer 192' vaporizes the reforming agent to form a water vapor as steam. The vapors exiting the vaporizers 192 and 192' are mixed within the common conduit portion and then discharged through the common outlet 216. The heating medium exits the vaporizers at the outlets 200 and 200'. According to one practice, the heating medium has a temperature at the inlet that is higher than the temperature at the outlet.

The heating medium can be captured by any suitable device for subsequent use or can be vented or released to the ambient environment. The mixed vapor exiting the common outlet 216 can be transferred or conveyed to one or more additional vaporizers or chemical converters, or to one or more other energy or power system components, or can be stored in a suitable storage container.

Figure 9:
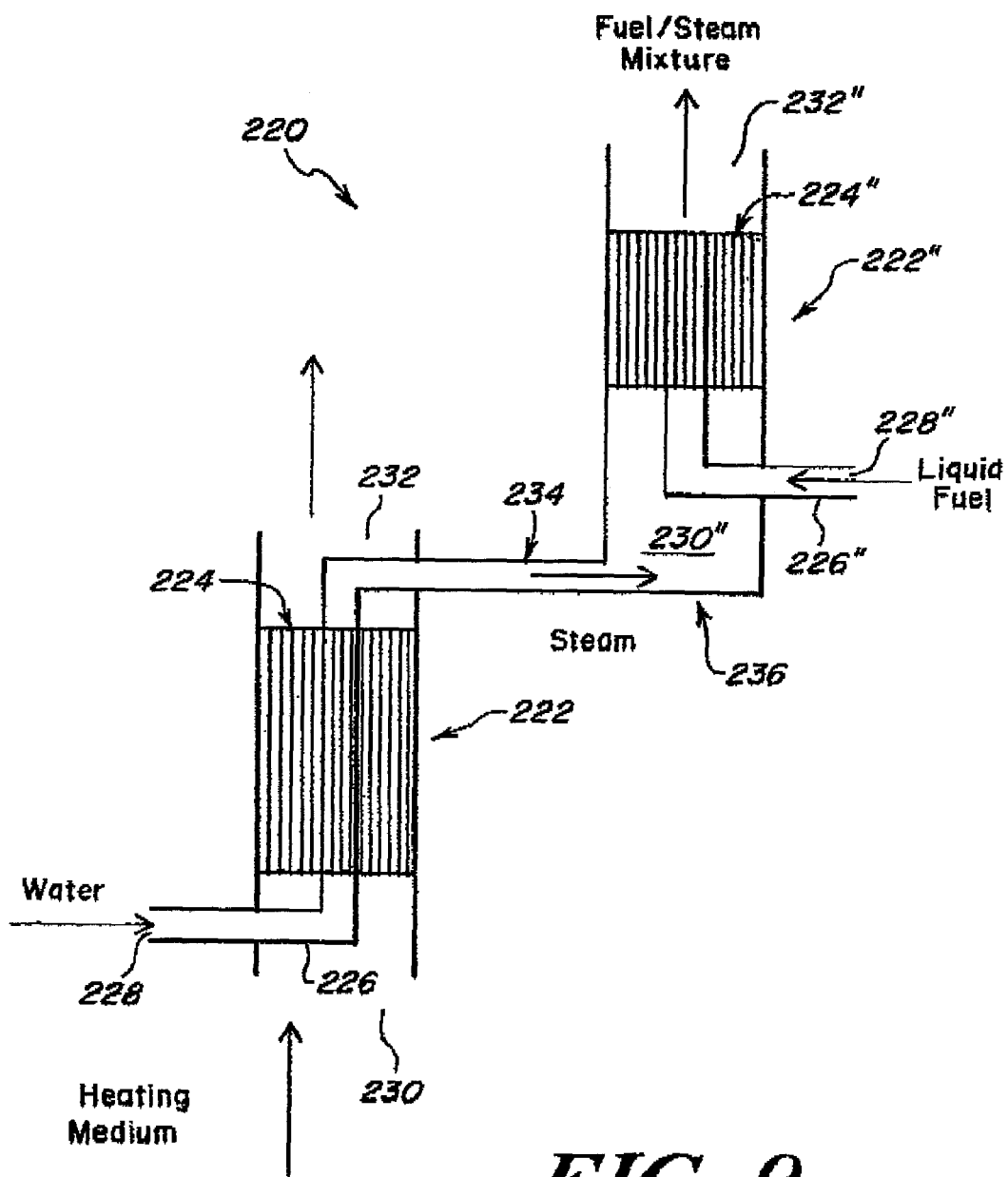
FIG. 9 is a perspective view of another embodiment of a system employing multiple vaporizers fluidly connected in series with each other for performing vaporization and mixing functions in a cascade arrangement.

FIG. 9 is a perspective view of another embodiment of a system employing multiple vaporizers according to the teachings of the present invention. The illustrated system 190 employs for example a pair of vaporizers 222 and 222" that are fluidly connected in series with each other. In this embodiment, the vaporizer 222 is configured to vaporize a first process fluid, and the vaporizer 222" is configured to evaporate a second process fluid. Moreover, the vaporizer 222" is adapted to mix the output stream of the vaporizer 222 with the output stream generated therein. The vaporizers 222 and 222" employ bundle elements 224 and 224", respectively. Notwithstanding the fluid arrangements of the illustrated conduit system 236, the bundle elements can be any of the bundle elements described herein. Those of ordinary skill will readily recognize that any selected number of vaporizers can be employed. Further, the vaporizers can be configured to thermally act upon the process fluids in ways different than those set forth herein.

As shown, the vertically positioned vaporizers 222 and 222" are fluidly coupled in series with each other. Specifically, the conduit system 236 includes a conduit 226 that is connected to the conduit connecting portion 234. The conduit connecting portion can optionally is then coupled to inlet chamber 230" of the vaporizer 222". The conduit system 236 can optionally include the conduit 226" of the bundle element 224".

An input process fluid, such as water, is introduced to the inlet 228 of the conduit 226 and then eventually to the bundle element 224. A heating medium is introduced to the chamber 230 of the vaporizer 222, and the thermal energy associated therewith vaporizes the process fluid within the bundle element 224 and forms steam. The heating medium exits the vaporizer 222 at the outlet 232. The steam is transferred to the conduit connecting portion 234, and then to the chamber 230" of the vaporizer 222". The steam serves as the heating medium for the vaporizer 222".

Another input process fluid, such as a liquid fuel, is introduced to the inlet 228" of the conduit 226". The conduit 226" forms part of the bundle element 224". The liquid fuel introduced through the inlet 228" into the bundle element 224" is evaporated by the thermal energy associated with the heating medium or the steam from the vaporizer 222 to form a fuel vapor. The fuel vapor generated within the bundle element 224" is then discharged therefrom into a chamber outlet 232" of the vaporizer 222", where it mixes with the heating medium (steam) generated by the first vaporizer 222. The combined fuel/steam mixture is then discharged from the vaporizer through the outlet 232". Those of ordinary skill will readily recognize that the heating medium has a temperature at the inlet of either vaporizer that is higher than the temperature at the outlet of the vaporizer.

The thermal changes and flow patterns imposed upon the liquid fuel and water within the bundle elements 224 and 224" have been described above and need not be repeated. The heating medium exiting the vaporizer 222 can be captured by any suitable device for subsequent use, can be stored in known storage containers, or can be vented or released to the ambient environment. The mixture exiting the outlet chamber 232" of the vaporizer 222" can be transferred or conveyed to one or more additional vaporizers or chemical converters, or to one or more other energy or power system components.

Those of ordinary skill will readily recognize that the foregoing vaporizers described in connection with all of the foregoing embodiments of the invention are suitable for use with one or more chemical converters or one or more components of conventional power or energy systems.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover generic and specific features of the invention described herein, and all statements of the scope of the invention which, as a matter of language, might be the to fall therebetween.

The invention claimed is:

1. A vaporizer suitable for use with a chemical converter, comprising
a housing forming a chamber, and
a bundle element disposed within the chamber,
wherein the bundle element includes a conduit in fluid communication with one or more heat exchanging surfaces defining a confined volume that is free of a baffle, wherein the bundle element comprises a multi-sheet layer forming the heat exchanging surface, wherein the multi-sheet layer is wrapped about and disposed in fluid communication with the conduit.

2. The vaporizer of claim 1, wherein the housing extends along an axis and is configured to be oriented essentially in a vertical position during use, wherein a process fluid is introduced to the conduit through an inlet disposed at a bottom portion of the housing, and exits the conduit from an outlet located at a top portion of the housing.

3. The vaporizer of claim 1, wherein the multi-sheet layer is sealed along selected outer edges.

4. The vaporizer of claim 1, wherein the housing includes a medium inlet and a medium outlet in fluid communication with the chamber, the medium inlet being adapted to receive a heating medium, and the heating medium flows through a space formed between facing wraps of the multi-sheet layer when wrapped about the conduit.

5. The vaporizer of claim 4, wherein the heating medium comprises at least one of an exhaust from the chemical converter and steam.

6. The vaporizer of claim 4, wherein the heating medium vaporizes the process fluid when disposed in the bundle element.

7. The vaporizer of claim 1, wherein the conduit comprises a fluid inlet and a fluid outlet adapted for receiving a process fluid.

8. The vaporizer of claim 7, wherein the fluid inlet and the fluid outlet of the conduit are fluidly isolated from the chamber.

9. The vaporizer of claim 7, wherein the process fluid comprises at least one of water, liquid chemical, liquid fuel, gasoline, methanol, and diesel.

10. The vaporizer of claim 1, wherein one or more sheets of the multi-sheet layer include surface features.

11. The vaporizer of claim 10, wherein the surface features comprise generally parallel rows of dimples or corrugations.

12. The vaporizer of claim 1, further comprising a conduit system having a second conduit in fluid communication with said bundle element and disposed outside said chamber, wherein said second conduit is configured as a liquid gauge to allow a user to determine visually the amount of liquid within the bundle element.

13. The vaporizer of claim 1, wherein at least one of the bundle element or the housing is formed of a high temperature material including nickel alloys.

14. The vaporizer of claim 1, wherein the heat exchanging surfaces comprise a plurality of sheets, at least one of the sheets having surface features forming spacers for separating the sheets from each other to form flow passages.

15. The vaporizer of claim 14, wherein the flow passages are disposed in fluid communication with the conduit.

16. The vaporizer of claim 1, wherein the bundle element comprises a plurality of tubes disposed within the conduit, wherein a wall of at least one of the plurality of tubes and the conduit forms the heat exchanging surface.

17. The vaporizer of claim 16, wherein the plurality of tubes is disposed in fluid communication with the chamber.

18. A system comprising a plurality of the vaporizers of claim 1, wherein the housings of the vaporizers are fluidly coupled to be in common fluid communication with each other, and wherein the bundle elements are fluidly coupled to be in separate common fluid communication with each other.

19. An evaporator/mixer suitable for use with a chemical converter, comprising
a housing forming a chamber, and
a bundle element disposed within the chamber,
wherein the bundle element includes a conduit in fluid communication with one or more heat exchanging surfaces defining a confined volume that is free of a baffle, wherein the bundle element further comprises a multi-sheet layer forming the heat exchanging surfaces, wherein the multi-sheet layer is wrapped about and disposed in fluid communication with the conduit.

20. The evaporator/mixer of claim 19, wherein the housing extends along an axis and is configured to be oriented essentially in a vertical position during use, wherein a process fluid is introduced to the conduit through an inlet disposed at a bottom portion of the housing, and exits the conduit from an outlet disposed at a top portion of the housing.

21. The evaporator/mixer of claim 19, wherein the multi-sheet layer is sealed along outer edges, and is unsealed along a top edge when the evaporator/mixer is disposed in a vertical position.

22. The evaporator/mixer of claim 21, wherein the chamber is configured for allowing a heating medium to pass therethrough, and wherein the bundle element is disposed in fluid communication with the chamber along the unsealed top edge so as to mix a process fluid exiting the bundle element with the heating medium in the chamber.

23. The evaporator/mixer of claim 19, wherein the housing includes a medium inlet and a medium outlet in fluid communication with the chamber, the medium inlet being adapted to receive a heating medium.

24. The evaporator/mixer of claim 23, wherein the heating medium comprises at least one of an exhaust from the chemical converter and steam.

25. The evaporator/mixer of claim 19, wherein the conduit comprises a fluid inlet and a fluid outlet adapted for receiving a process fluid, wherein said fluid outlet of the conduit is disposed in fluid communication with the chamber, wherein said chamber is adapted to receive a heating medium.

26. The evaporator/mixer of claim 25, wherein the process fluid comprises at least one of water, liquid chemical, liquid fuel, gasoline, methanol, and diesel.

27. The evaporator/mixer of claim 25, wherein the heating medium in said chamber evaporates the process fluid in the bundle element.

28. The evaporator/mixer of claim 19, wherein one or more of the sheets of the multi-sheet layer includes surface features.

29. The evaporator/mixer of claim 28, wherein the surface features comprise generally parallel rows of dimples or corrugations.

30. The evaporator/mixer of claim 19, wherein at least one of the bundle element or the housing is formed of a high temperature material including nickel alloys.

31. The evaporator/mixer of claim 19, wherein the heat exchanging surfaces comprise a plurality of sheets, at least one of the sheets having surface features forming spacers for separating the sheets from each other to form flow passages.

32. The evaporator/mixer of claim 19, wherein the bundle element comprises a plurality of tubes disposed within the conduit, wherein the wall of at least one of the plurality of tubes and the conduit forms the heat exchanging surfaces.

33. The evaporator/mixer of claim 32, wherein the plurality of tubes is disposed in fluid communication with the chamber.

34. A system comprising a plurality of the evaporator/mixers of claim 19, wherein the housings of the evaporator/mixers are fluidly coupled to be in common fluid communication with each other, and wherein the bundle elements are fluidly coupled to be in separate common fluid communication with each other.

35. A system comprising a vaporizer suitable for use with a chemical converter, comprising
a housing forming a chamber, and
a bundle element disposed within the chamber, wherein the bundle element includes a conduit in fluid communication with one or more heat exchanging surfaces defining a confined flow volume that is free of a baffle, wherein the bundle element is fluidly coupled with the housing of the evaporator/mixer of claim 19.

36. The vaporizer of claim 1 or the evaporator/mixer of claim 19, wherein the housing has a diameter of about 12 inches or less.

37. The vaporizer of claim 1 or the evaporator/mixer of claim 19, wherein the housing is in fluid communication with a treatment stage having a cylindrical configuration with a diameter of about 12 inches or less.

38. The vaporizer or the evaporator/mixer of claim 37, wherein the treatment stage comprises at least one of a water deionizer, a fuel desulfurizer, a CO to $H_2$ shift reactor, and a $H_2$ purification absorber.

39. A system for vaporizing a fluid, comprising
a first vaporizer having a housing forming a chamber, and a first bundle element disposed within the chamber, said first bundle element having a first conduit, and
a second vaporizer having a housing forming a chamber, and a second bundle element disposed within the chamber, said second bundle element having a second conduit,
wherein the first and second conduits are coupled to a common inlet and a common outlet, wherein at least one of the first and second bundle elements further comprise a multi-sheet layer forming the heat exchanging surface, wherein the multi-sheet layer is disposed in fluid communication with the respective conduit.

40. The system of claim 39, wherein at least one of the first and second bundle elements comprises one or more heat exchanging surfaces in fluid communication with the respective conduit defining a confined flow volume that is free of a baffle.

41. The system of claim 39, wherein the housings of the first and second vaporizers are configured to be oriented essentially in a vertical position during use, wherein a process fluid is introduced to the first and second conduits through the common inlet disposed at a bottom portion of the housings, and exits the first and second conduits through the common outlet located at a top portion of the housing.

42. The system of claim 39, wherein at least one of the first and second bundle elements comprise a plurality of tubes disposed within the respective conduit, wherein a wall of at least one of the plurality of tubes or the conduit forms the heat exchanging surface.

43. A system for vaporizing a fluid, comprising
a first vaporizer having a housing forming a chamber, and a first bundle element disposed within the chamber, said first bundle element having a first conduit, and
a second vaporizer having a housing forming a chamber, and a second bundle element disposed within the chamber, said second bundle element having a second conduit,
wherein the first and second conduits are coupled to a common outlet, wherein at least one of the first and second bundle elements further comprise a multi-sheet layer forming the heat exchanging surface, wherein the multi-sheet layer is disposed in fluid communication with the respective conduit.

44. The system of claim 43, wherein at least one of the first and second bundle elements comprises one or more heat exchanging surfaces in fluid communication with the respective conduit defining a confined flow volume that is free of a baffle.

45. The system of claim 43, wherein the housings of the first and second vaporizers are configured to be oriented essentially in a vertical position during use, wherein a first process fluid is introduced to the first conduit through an inlet and a second process fluid is introduced to the second conduit through an inlet, and the two process fluids are mixed and then exit the first and second conduits through the common outlet.

46. The system of claim 45, wherein a liquid fuel is introduced to the first conduit and a reforming agent is introduced to the second conduit.

47. The system of claim 43, wherein at least one of the first and second bundle elements comprise a plurality of tubes disposed within the respective conduit, wherein a wall of at least one of the plurality of tubes or the conduit forms the heat exchanging surface.

48. A system for vaporizing a fluid, comprising
a first vaporizer having a first housing forming a chamber, and a first bundle element disposed within the chamber, said first bundle element having a first conduit, and
a second vaporizer having a second housing forming a chamber, and a second bundle element disposed within the chamber, said second bundle element having a second conduit,
wherein an outlet of the first conduit is fluidly coupled to an inlet of the second housing.

49. The system of claim 48, wherein at least one of the first and second bundle elements comprises one or more heat exchanging surfaces in fluid communication with the respective conduit defining a confined flow volume that is free of a baffle.

50. The system of claim 48, wherein the housings of the first and second vaporizers are configured to be oriented essentially in a vertical position during use, wherein a process fluid is introduced to an inlet of the first conduit, and exits the first conduit at an outlet thereof as a process exhaust, and wherein the process exhaust is introduced to the inlet of the second housing.

51. The system of claim 48, wherein at least one of the first and second bundle elements further comprise a multi-sheet layer forming the heat exchanging surface, wherein the multi-sheet layer is disposed in fluid communication with the respective conduit.

52. The system of claim 48, wherein at least one of the first and second bundle elements comprise a plurality of tubes disposed within the respective conduit, wherein a wall of at least one of the plurality of tubes or the conduit forms the heat exchanging surface.

* * * * *